May 29, 1928.
E. G. THOMAS
1,671,260
PREDETERMINED WEIGHT SCALE
Filed Jan. 24, 1923
3 Sheets-Sheet 1
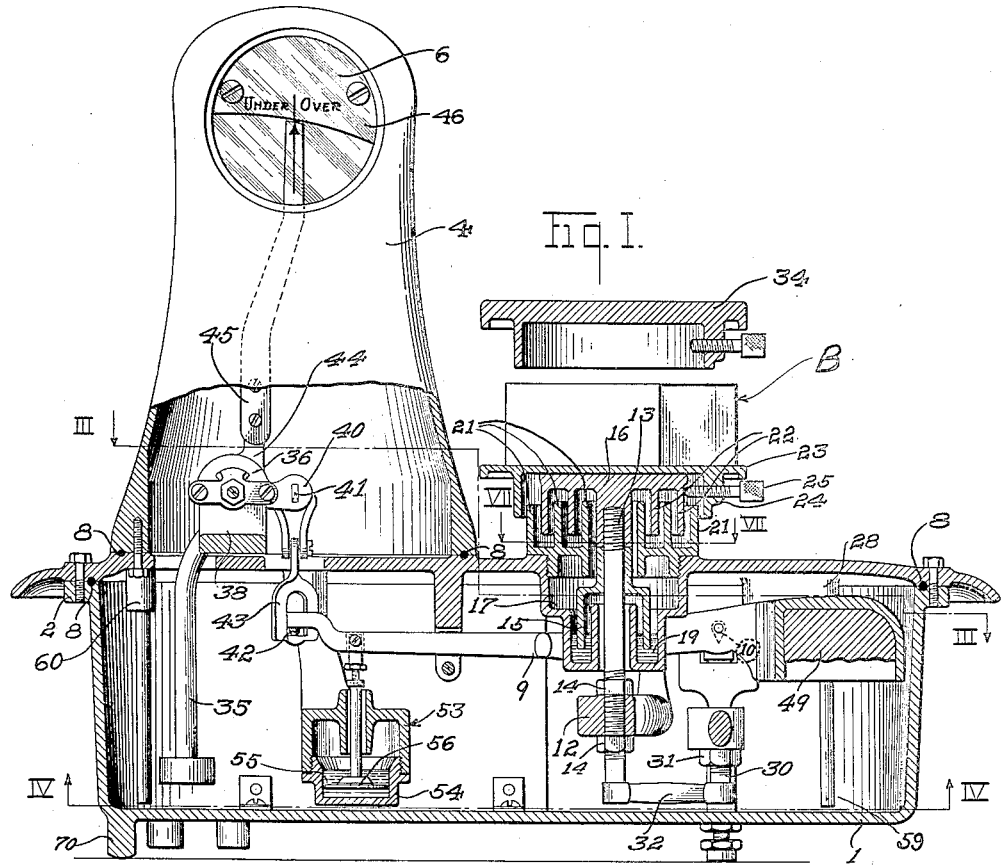
Fig. I.
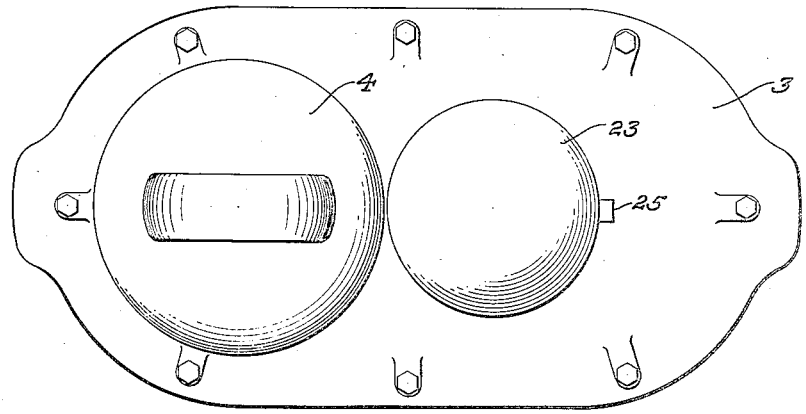
Fig. II.
Inventor
EDWARD G. THOMAS.
By C O Marshall
Attorney

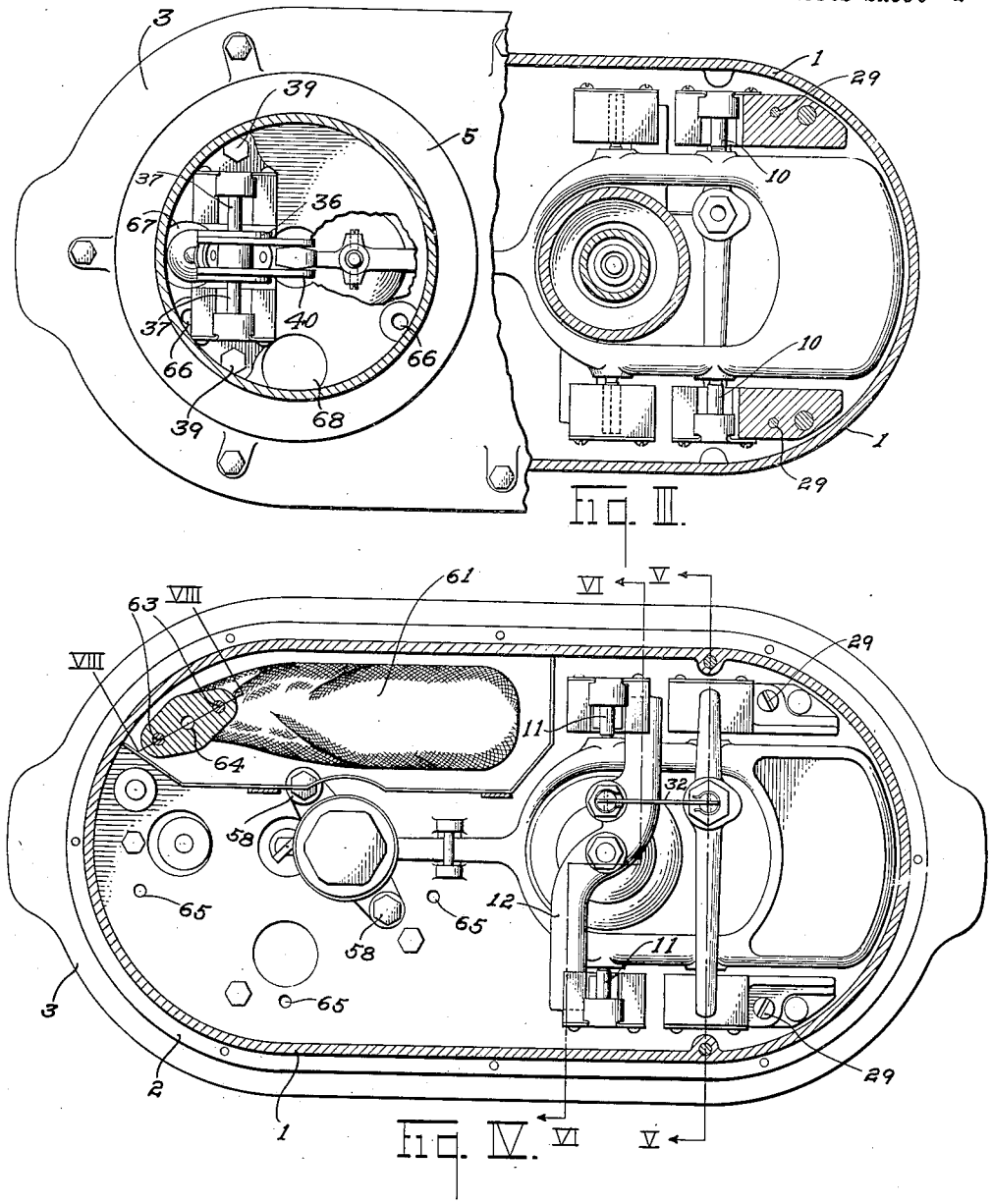

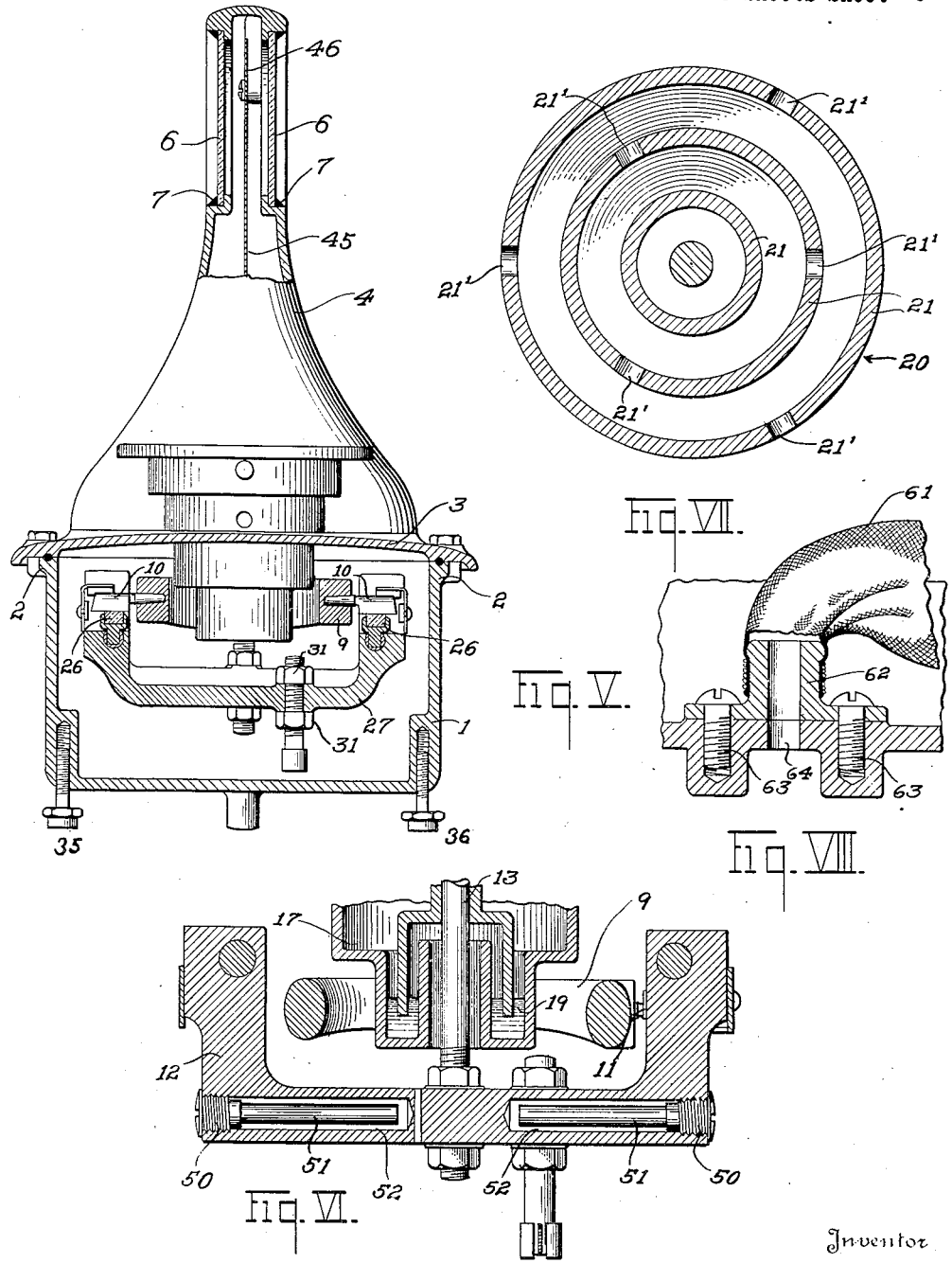

Patented May 29, 1928.

1,671,260

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

PREDETERMINED-WEIGHT SCALE.

Application filed January 24, 1923. Serial No. 614,517.

This invention relates to weighing scales, and particularly to scales of the class known as predetermined weight scales.

One object of my invention is to provide a scale which is particularly adapted for use in dairies, for weighing prints of butter, and is adaptable for use in other industries where the products consist of commodities which are required to be of substantially uniform weight.

Another object is to provide a scale, the housing of which is substantially air tight, and which thus prevents changing of the air surrounding the scale parts. Changing of the air promotes oxidation and thereby tends to set up friction in the scale and cause it to weigh inaccurately.

The usual practice in dairies is to direct a stream of water upon the scale when it is desired to clean it, and another object of my invention is to provide a scale which is so constructed as to practically prevent the entrance of water into the scale housing when this practice is followed.

Another object of my invention is to provide an air tight sealing means for the movable platform supporting mechanism which does not affect the accuracy of the scale by setting up friction between the parts.

Another object is to provide a scale having the advantages above mentioned in which the indicating means may be adjusted so as to be visible from the front or rear or from either side of the scale.

Another object is to provide a scale having a plurality of platters or commodity-receivers, each complementary to the desired weight of a commodity so that when a light commodity is weighed and a heavy platter is used, the additional weight of the platter plus the weight of the commodity brings the indicator to the predetermined weight mark. The scale may thus be adjusted to weigh various loads by merely changing platters.

Another object of my invention is the provision of a novel construction whereby the complete weighing mechanism may be assembled and sealed before it is placed in the housing and may be removed intact therefrom for inspection or repair.

Still another object is the provision of means for compensating for changes, under varying atmospheric pressure, in volume of the air contained in the housing without permitting egress of the contained air or ingress of outside air.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a sectional elevational view of the scale of my invention showing an auxiliary commodity-receiver;

Figure II is a top plan view of the scale;

Figure III is a sectional view taken substantially on the line III—III of Figure I;

Figure IV is a sectional view taken substantially on the line IV—IV of Figure I;

Figure V is a vertical sectional view taken on the line V—V of Figure IV;

Figure VI is an enlarged fragmentary sectional view taken substantially on the line VI—VI of Figure IV;

Figure VII is an enlarged detail sectional view taken on the line VII—VII of Figure I; and Figure VIII is an enlarged fragmentary sectional view taken substantially on the line VIII—VIII of Figure IV.

Referring to the drawings in detail, the scale of my invention is supported by a substantially oval base housing 1 having a peripheral flange 2 upon which is mounted a cover plate 3 fixedly secured to said flange by means of screws. Mounted upon one end of the plate 3 is an upright housing 4 having a substantially circular lower end which is fixedly secured to the plate 3 by means of screws. Located in the upper end of the housing 4 are windows 6 which are sealed in place by means of putty 7, or are otherwise made air and water tight. Interposed between the flange 2 of the base housing 1 and the plate 3 and between the plate 3 and the upright housing 4 are gaskets 8 composed of plastic material, such as wax, lead, rubber or other material suitable to provide an air tight joint between the parts.

The principal lever 9 of the weighing mechanism is a lever of the second order, fulcrumed upon pivots 10, the nose of the lever being connected to pendulum load-counterbalancing mechanism. Supported upon load pivots 11 of the lever 9 is a U- shaped member 12 to which is fixed a rod 13 that projects upwardly through an opening in the plate 3 and supports the platter spider. The lower end of the rod is threaded to receive nuts 14 for adjusting the rod in the member 12 and locking it in position. Fixedly secured upon the rod 13 is an inverted cup-like member 15, and threaded upon the upper extremity is a platter-supporting spider 16. Integral with the cover plate 3 and surrounding the opening therein is an annular well 17 with its inner wall surrounding the rod 13. The annular well thus formed is partly filled with oil or other suitable liquid 19 and the wall of the inverted cup-like member 15 projects into such liquid, thus forming a liquid seal to prevent air or moisture from entering the scale housing.

Threaded into the upper portion of the annular well 17 is a substantially circular member 20 having a plurality of concentric upstanding flanges or baffle walls 21. The platter-supporting spider 16 is formed with a plurality of concentric depending baffle walls 22 which are received in the annular spaces formed between the baffle flanges 21 of the member 20.

It is believed to be apparent from the foregoing description, taken in connection with the parts of the drawings therein referred to, particularly parts of Figure I, that the platter and supporting structure are free to move without appreciable friction, while at the same time air, water and other foreign matter are prevented from entering the scale housing. If, when cleaning the scale, any water should find its way into the labyrinth among the baffle plates, it may escape through a plurality of apertures 21' which are provided in the flanges 21. Accumulation thereof in the annular passageways between the flanges 21, subsequent passage into the well 17, and eventual entry into the base housing 1 are thus prevented.

The platter or commodity-receiver 23 having an annular flange 24 and provided with a set screw 25 is removably secured to the spider 13 by means of the set screw. The bearings 26 which support the fulcrum pivots 10 of the lever 9 are mounted in the upwardly projecting arms of a U-shaped bracket 27 which is fixedly secured by means of screws 29 to bosses 28 formed upon the plate 3.

The load-counterbalancing mechanism comprises a pendulum 35 secured to a member 36 which is mounted upon knife edge pivots 37 resting in V groove bearing pieces supported by a bracket or stand 38 fixedly secured to the cover plate 3 by means of screws 39. The member 36 is formed with a pair of ears 40 which support a knife edge pivot 41, the knife edge of the pivot 41 being positioned directly above a cone pivot 42 which is fixedly mounted in the nose end of the lever 9, and the pivots 41 and 42 are operatively connected by means of a two-part link 43. The member 36 is also formed with an upwardly projecting arm 44, to which is secured an indicator hand 45. A chart 46 with which the hand 45 co-operates is arranged in the plane of movement of the hand and is fixedly secured by screws 47 in the upper portion of the housing 4. The chart and upper portion of the hand are visible from both sides of the housing through the windows 6. As is clearly shown in Figure I, the chart 46 bears a single mark, with which an arrow mark on the indicator hand is adapted to register, the words "Under" and "Over" being printed upon the chart to indicate whether the weight of the commodity exceeds or is less than a predetermined desired weight.

The enlarged end of the lever 9 of the scale is filled with lead or other heavy material 49 to offset the weight of the platter and spider and associated parts. Suitable means is provided for sealing the scale, comprising a pair of threaded members 50 (see Figure VI), each having a central bore adapted to receive a bar of lead 51. A pair of apertures 52 in the spider 12 receives the members 50 and the lead 51. If the scale weighs "fast", one or both the members 50 may be taken out and lead removed until correct balancing of the mechanism is obtained. If the scale weighs "slow", lead may be added to 51 or enough of the lead 49 in the lever 9 may be removed to make the scale weigh correctly, or even slightly "fast." A fine adjustment may be had by removing some of the lead 51 or by adding to it.

As has been previously stated, the scale is particularly adapted for use in dairies for checking the weight of prints of butter. In the operation of the scale for this purpose, a print of butter B is placed upon the platter, causing the nose end of the lever to move downwardly and swinging the pendulum 35 outwardly to counterbalance the weight on the platter. If the indicator registers with the predetermined weight mark on the chart, the weight of the print is correct. If it registers "Under" or "Over", as the words imply, the weight is incorrect, and butter is added to or removed from the print until the indicator shows that the print has been brought to the correct weight.

For the purpose of damping the oscillations of the pendulum, a dash pot 53 is provided. The dash pot comprises a cylinder 54 containing a quantity of oil 55 and a piston 56 which works in the oil and is pivotally connected to the lever 9. The dash pot is secured to the cover plate 3 by means of screws 58.

It will be obvious from the foregoing description that it would be almost impossible and totally impractical to seal the scale within the housing. To eliminate this difficulty I have so constructed the scale that the entire mechanism is supported on the cover plate 3 and have provided a plurality of legs 59 threaded into the bosses 28 and 60 integral with the cover plate 3 which are adapted to support the cover plate and weighing mechanism when they are removed from the housing 1.

With this construction the mechanism may be sealed while the plate is standing on the legs. It also makes the scale parts easily accessible for inspection, repair or replacement.

From the foregoing description it will be apparent that the scale mechanism is enclosed in a container that has no openings except that surrounding the spider stem. Normally the oil seal with which this opening is equipped will prevent ingress or egress of air if the barometric pressure and temperature remain constant. Atmospheric pressure and temperature are, however, constantly changing, and if no means were provided to permit expansion and contraction of the air within the scale housing, bubbles would be forced under the lip of the inverted cup-like member 15 as the contained air expanded and contracted. Its moisture content would be thus replenished at a rate sufficient to support oxidation and corrosion of the scale parts. To obviate this possibility I have provided a flexible rubber bag 61, the mouth of which is secured to a metal nipple 62 fastened to the base housing 1 by means of screws 63. An aperture 64 in the base 1 connects with the aperture in the nipple 62 so that air may pass freely to and from the rubber bag (see Figures IV and VIII). Since the pressure required to cause air to flow into or out of the bag is very much less than that which would be required to force air under the lip of the inverted cup-like member 15, it will be apparent that variations due to changes in pressure or temperature will be compensated for by partial inflation or deflation of the rubber bag 61 without change of the air surrounding the scale parts.

Sometimes it is desirable to read the scale across the platter 23. In this event the screws which secure the circular lower end of the upright housing to the plate 3 (the hexagonal heads of the screws being shown in Figure IV) are removed and the upright housing 4 turned through an angle of 90°. The threaded apertures in the housing 4 will then coincide with the openings 65 in the cover plate 3. The pendulum and supporting bracket must, of course, be turned through a like angle. The pendulum is removed, the screws 39 are removed from the plate 3, and the bracket 38 is turned through 90°. The screws are then inserted in the openings 66 of the cover plate, the bracket made fast, and the pendulum replaced. As shown in Figure III, the pendulum stem passes through the opening 67 in the plate 3, but in the changed position just described the stem will pass through the opening 68. Checking means is provided to maintain the platform supporting stem in a substantially vertical position. This means comprises a rod or stem 30 adjustably secured to the bracket 27 by means of a pair of nuts 31 and a link 32, which connects the lower extremities of the rods 13 and 30 and is loosely pinned thereto so that friction is reduced to a minimum.

Dairies usually pack butter or other commodities in cartons containing different weights, and it is, therefore, desirable to arrange the scale to handle commodities of several different weights. In the scale of my invention I have avoided the necessity of readjusting the counterbalancing mechanism by providing a plurality of platters of various weights which are complements of the weights of the several sizes of prints so packed. For instance, if the scale is adjusted to weigh 2 lb. prints of butter and it is desired to change to 1 lb. prints, it is only necessary to replace the platter 23 with another platter of 1 lb. greater print. A 1 lb. print on the heavy platter will bring the indicator to the same point as a 2 lb. print on the light platter. If it is desired to weigh pieces of butter for half pound packages, a platter weighing still one-half pound more is employed. It is understood that the scale may be equipped with any desired number of vari-weighted platters.

The scale may be tested as often as desired by placing a test weight on the platter. Should the test weight fail to bring the indicator exactly to the predetermined weight mark, the scale may be adjusted by turning the leveling screws 35 and 36 until the predetermined weight mark and the indicator are brought into registration. If the upright housing 4 is mounted, as in Figure I, so that the indicator swings lengthwise of the base housing 1, the leveling screws are turned in the same direction to tilt the scale on the foot 70 in the plane of movement of the pendulum. If the housing 4 is turned so that the indicator swings crosswise of the housing 1, the leveling screws are turned in opposite directions to tilt the scale laterally in the plane of movement of the pendulum.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, weighing mechanism, indicating mechanism, a housing enclosing said weighing and indicating mechanisms, a commodity-receiver supported by said weighing mechanism and located exteriorly of said housing, and means for preventing the entrance of air into said housing.

2. In a weighing scale, in combination, weighing mechanism, indicating mechanism, a housing enclosing said weighing and indicating mechanisms, said housing having a transparent window through which said indicating mechanism is visible, a commodity-receiver supported by said weighing mechanism and located outside said housing, and means to prevent the entrance of air into said housing.

3. In a weighing scale, in combination, weighing mechanism, indicating mechanism, a housing enclosing said mechanisms, a commodity-receiver, means connecting said commodity-receiver and said weighing mechanism, said housing having an opening through which said connecting means passes and being otherwise air and water tight, and a seal in said opening for preventing the entrance of air into said housing.

4. In a weighing scale, in combination, weighing mechanism, indicating mechanism, a housing enclosing said mechanisms, a commodity-receiver, means connecting said commodity-receiver and said weighing mechanism, said housing having an opening through which said connecting means passes and being otherwise air and water tight, and a fluid seal in said opening for preventing the entrance of air into said housing.

5. In a weighing scale, in combination, weighing mechanism, indicating mechanism, a housing enclosing said mechanisms, a commodity-receiver, means connecting said commodity-receiver and said weighing mechanism, said housing having an opening through which said connecting means passes and being otherwise air and water tight, a seal in said opening for preventing the entrance of air into said housing, and baffle means for preventing water from entering said opening.

6. In a weighing scale, in combination, a housing, said housing having an opening and being otherwise air tight, a commodity-receiver support passing through said opening, means for preventing ingress and egress of air through said opening, and means for maintaining the pressure of the air contained in said housing at substantially the pressure of the surrounding air.

7. In a weighing scale, in combination, a housing, said housing having an opening and being otherwise air tight, a commodity-receiver support passing through said opening, a fluid seal in said opening for preventing ingress and egress of air through said opening, and means for maintaining the pressure of the air contained in said housing at substantially the pressure of the surrounding air.

8. In a weighing scale, in combination, a housing, said housing having an opening therein, a commodity-receiver support passing through said opening, a fluid seal in said opening for preventing the ingress and egress of air therethrough, said housing having a second opening, and means connected to said second opening for maintaining the pressure of the contained air at substantially the pressure of the surrounding air.

9. In a weighing scale, in combination, a housing, said housing having an opening therein, a commodity-receiver support passing through said opening, a fluid seal in said opening for preventing the ingress and egress of air therethrough, said housing having a second opening, and an air receiver of variable volume connected to said second opening for maintaining the pressure of the contained air at substantially the pressure of the surrounding air.

10. In a weighing scale, in combination, a housing, said housing having an opening therein, a commodity-receiver support passing through said opening, a fluid seal in said opening for preventing the ingress and egress of air therethrough, said housing having a second opening, and a flexible air tight bag connected to said second opening for maintaining the pressure of the contained air at substantially the pressure of the surrounding air.

11. In a weighing scale, in combination, a housing, said housing having an opening therein, a commodity-receiver support passing through said opening, a plurality of upstanding baffles connected to said housing and surrounding said opening, and baffle means connected to said commodity-receiver support and overlapping the first said baffles.

12. In a weighing scale, in combination, a housing, said housing having an opening therein, a commodity-receiver support passing through said opening, a plurality of concentric upstanding baffles secured to said housing and surrounding said opening, and a plurality of depending baffles secured to said commodity-receiver support and overlapping said upstanding baffles, certain of said upstanding baffles having non-registering openings to permit the escape of liquid.

13. In a weighing scale, in combination, a base housing member open at its upper end, a cover for said base housing member, weighing mechanism supported by said cover, part of said weighing mechanism being located within said base housing when the cover is in place thereon, and means for supporting said cover with said weighing mechanism supported thereby in operative condition when said cover is removed from said base housing member.

14. In a weighing scale, in combination, a housing comprising a base member and an upright member supported thereon, said upright member having a transparent window, weighing and indicating mechanisms supported within said housing, said indicating mechanism including an indicator visible through said window, said upright housing member being turnable to render said indicator visible from a plurality of positions, and means for preventing the entrance of air into said housing.

EDWARD G. THOMAS.